Patented Feb. 11, 1930

1,746,875

UNITED STATES PATENT OFFICE

MERWYN C. TEAGUE, OF ELMHURST, NEW YORK, ASSIGNOR TO AMERICAN RUBBER COMPANY, OF EAST CAMBRIDGE, MASSACHUSETTS, A CORPORATION OF MASSACHUSETTS

METHOD OF FORMING TACKY RUBBER COMPOUND AND PRODUCTS

No Drawing.   Application filed June 9, 1924.   Serial No. 719,017.

This invention relates to a method of forming a tacky rubber compound and to the products formed, more particularly to a method of making such products directly from a water dispersion of rubber such as latex.

For certain purposes in the rubber art the use of a tacky rubber compound is indicated, such as when making plied goods, adhesive cements for rubber footwear and other purposes, adhesive tape, etc. It has been known that certain ingredients such as pine tar, rosin, coal tar, hardwood pitch, and other materials have the property of imparting tackiness to rubber with which they are compounded, and these materials when so used have been mixed with the rubber in plastic form on a mill in the usual manner. As such rubber must first be formed from latex by some one of the usual methods of coagulating or drying and then broken down on a mill the process involves the expenditure of considerable time, labor and power. Prior to my invention there has been no method by which water insoluble substances of the character specified could be mixed in water soluble and non-coagulative form directly with latex.

An object of my invention is to provide a process for forming tacky rubber compounds directly from latex or other water dispersion of rubber. Another object is to provide a process for mixing with latex an ingredient in water soluble form for imparting tackiness to the resulting rubber. Another object is to provide a process for making a stabilized latex for use in making a tacky rubber compound. A further object is to provide a stabilized latex embodying an ingredient producing tackiness when dried. A still further object is to provide an improved tacky rubber compound. A still further object is to provide a tacky dried rubber latex.

For a detailed disclosure of the nature and objects of the invention reference is had to the accompanying specification and claims.

The invention comprises, broadly, converting an ingredient imparting tackiness into an easily-decomposable water-soluble compound, mixing such a compound with a water dispersion of rubber such as latex, and reconverting the compound into the original ingredient. The invention also comprises the products of the process.

In carrying out the invention any suitable substance comprising an ingredient or ingredients imparting tackiness, more particularly a distillation residue containing heavy hydrocarbon such as pine tar, rosin, coal tar, hardwood pitch, etc., and preferably those derived from ligneous matter, of an acidic character or containing combined acid radicals, is first converted into an easily decomposable water soluble compound, preferably by combining or saponifying it with a volatile base such as ammonia, or with a substituted ammonia, such as methyl amines, ethyl amines, etc. By heavy hydrocarbon is meant those hydrocarbons high up in the various homologous series, that is having a relatively high proportion of carbon, and which remain after the lower boiling fractions have been distilled off. It is preferred to effect such combination by the process disclosed in my co-pending application, Serial No. 15,407, filed March 13, 1925, but the invention is of course not limited to the use of this method. By this process rosin, pine tar, or other organic acidic material is treated with concentrated aqueous ammonia in a closed vessel and the mixture subjected to heat and pressure to form an easily decomposable compound of the reacting ingredients. The amount of heat and pressure varies with the acid value of the material. The result of the above-mentioned process is to produce an ammonium or ammonium-base compound or saponification product of the tackiness imparting ingredients, which is water soluble and easily decomposable, for instance, one that will decompose at normal room temperatures, by slightly heating it, or by drying. This compound is then, either as such or in water solution, mixed with the latex and has the property of stabilizing the resulting mixed latex for considerable periods, such as a week or more. The latex used may be one in its natural concentration or modified as circumstances may require. By reason of this stabilizing large batches of latex mixes suitably compounded for various purposes can be economically and conveniently made up in a factory for use as needed. The stabilized latex mixture is then used in any desired manner, for instance as a cement for making footwear, etc., for making plied goods, for coating in making such articles as adhesive tape, and in any of the other cases in which a tacky rubber compound is applicable. The term tacky is used to indicate a sticky or adhesive quality of the rubber. This quality is sought in making certain rubber cements. During the drying operation after use of the latex mixture as above described the ammonia is split off and removed, leaving the tackiness imparting ingredient in an insoluble form uniformly distributed in the rubber from the latex. If desired the latex mixture containing the water soluble compound may first be dried in any suitable manner, thereby eliminating the ammonia as above described and leaving a tacky rubber compound which may be used in the same manner as similar rubber compound mixed on a mill by the prior known methods. By the method above described an ingredient for imparting tackiness may be introduced into rubber without the necessity of mixing in on a mill and without the introduction into the final product of any unnecessary or objectionable substance. The prepared mixture forms a cement which is not in itself tacky but assumes this condition when the base is eliminated—for example by driving off the ammonia by drying at normal or elevated temperature.

An example of a tacky compound suitable for use as a shoe cement is as follows:

100 parts rubber by weight as latex containing 33⅓% solids.

20 parts ammonium resinate (dry basis) by weight.

280 parts water (not including that in the latex).

24 parts litharge by weight.

4.2 parts sulphur by weight.

In mixing the above compound a paste is made of the litharge and sulphur, by using the ammonium resinate solution, and the mixture is then added to the latex and stirred well. Concentrated latex may be used if desired, in which case the added water would be accordingly reduced in quantity. If a solvent is desired in the compound 200 parts of solvent naphtha may be added slowly to the previously made latex mixture while stirring vigorously. The consistency of the compound may also be varied by a change in the amount of water added. The litharge acts as a thickener and also as an accelerator of vulcanization.

The above mixture when dried forms a tacky cement particularly adapted for use in the manufacture of footwear. There may be substituted for the ammonium resinate in the above example 20 parts of the ammonium compound of pine tar. Any of the described compounds may be vulcanized in open heat or by steam at atmospheric pressure or in any other suitable manner. In the making of some tacky rubber compounds reclaimed rubber is used, and in this case such rubber may be formed into a water dispersion in any of the known ways and then mixed with the tackiness imparting ingredients in the manner above described, with or without the addition of latex. Or if desired instead of latex there may be used a water dispersion of coagulated rubber formed in any of the known ways.

While specific examples of the invention have been given, with the use of specific ingredients, it is capable of broad application, and other materials may be substituted as long as the desired water insoluble ingredient for imparting tackiness is converted into an easily decomposable water soluble compound and then reconverted into an insoluble condition after mixture with the water dispersion of rubber. It is therefore not desired to limit the invention except as set forth in the appended claims and their equivalents.

Having thus described my invention what I claim and desire to protect by Letters Patent is:

1. The method of forming a tacky rubber compound which comprises mixing with a water dispersion of rubber an easily decomposable water soluble compound of a water insoluble ingredient for imparting tackiness, and decomposing said water soluble compound and removing therefrom that portion rendering it soluble, whereby a tacky rubber product is obtained.

2. The method of forming a tacky rubber compound which comprises mixing a water soluble easily decomposed compound of a basic substance and an acidic tackiness imparting ingredient with a water dispersion of rubber, and eliminating said basic substance, whereby a tacky rubber product is obtained.

3. The method of forming a tacky rubber compound which comprises mixing a water soluble easily decomposed compound of a volatile base and a tackiness imparting ingredient containing acid radicals with a water dispersion of rubber, and removing said base by drying whereby a tacky rubber product is obtained.

4. The method of forming a tacky rubber compound which comprises mixing with a water dispersion of rubber the water soluble reaction product of a volatile base and an acidic distillation residue containing heavy hydrocarbon, and removing the volatile portion of the mixture by drying.

5. The method of forming a tacky rubber compound which comprises mixing with latex the water soluble reaction product of ammonia and an acidic heavy hydrocarbon distillation residue derived from ligneous material, and drying the mixture whereby a tacky rubber product is obtained.

6. The method of forming a tacky rubber compound which comprises mixing with a water dispersion of rubber the water soluble reaction product of ammonia and pine tar, and drying the mixture.

7. The step in forming a tacky rubber compound which comprises stabilizing rubber latex by mixing therewith the water soluble compound of a volatile base and an acidic heavy hydrocarbon derived from ligneous matter distillation residue.

8. The step in forming a tacky rubber compound which comprises stabilizing rubber latex by mixing therewith the water soluble compound of ammonia and an acidic heavy hydrocarbon distillation residue derived from ligneous matter.

9. As a new article, a rubber dispersion containing a heat decomposable compound of a volatile basic substance and a tackiness imparting ingredient derived from ligneous matter.

10. As a new article, a stabilized latex containing a heat decomposable compound of an acidic heavy hydrocarbon derived from ligneous matter distillation residue.

11. As a new article, a stabilized latex containing a heat decomposable compound of a heavy hydrocarbon distillation residue derived from ligneous matter.

12. As a new article, a stabilized latex containing the water soluble reaction product of a volatile base and an acidic heavy hydrocarbon derived from ligneous matter distillation residue.

13. As a new article a stabilized latex containing the reaction product of ammonia and an acidic heavy hydrocarbon derived from ligneous matter distillation residue.

14. As a new article, a stabilized latex containing the reaction product of ammonia and a heavy hydrocarbon distillation residue derived from ligneous matter.

15. As a new article, a stabilized latex containing the reaction product of ammonia and pine tar.

16. As a new article, rubber derived from compounded latex by drying and containing as a decomposition product by the agency of drying a water insoluble tackiness imparting pine tar constituent.

Signed at New York, county of New York, and State of New York, this 2nd day of June, 1924.

MERWYN C. TEAGUE.

CERTIFICATE OF CORRECTION.

Patent No. 1,746,875.  Granted February 11, 1930, to

MERWYN C. TEAGUE.

It is hereby certified that error appears in the printed specification of the above numbered patent requiring correction as follows: Page 2, lines 129 and 130, claim 5, strike out "distillation residue", and in line 129, after "acidic" insert "distillation residue containing"; page 3, line 11, claim 7, after the word "acidic" insert "distillation residue containing", and line 13, strike out "distillation residue"; lines 17 and 18, claim 8, strike out "heavy hydrocarbon" and in line 18, after "residue" insert "containing heavy hydrocarbon"; line 27, claim 10, after the word "acidic" insert the words "distillation residue containing" and line 28, strike out "distillation residue"; line 31, claim 11, before the word "heavy" insert the words "distillation residue containing" and in the same line, after "hydrocarbon" strike out "distillation residue"; line 35, claim 12, after "acidic" insert "distillation residue containing" and lines 36 and 37, strike out "distillation residue"; line 40, claim 13, after the word "acidic" insert "distillation residue containing" and line 41, strike out "distillation residue"; line 44, claim 14, before the word "heavy" insert "distillation residue containing" and same line, after "hydrocarbon" strike out "distillation residue"; and that the said Letters Patent should be read with these corrections therein that the same may conform to the record of the case in the Patent Office.

Signed and sealed this 1st day of July, A. D. 1930.

(Seal)

M. J. Moore,
Acting Commissioner of Patents.